(12) United States Patent
Bailey et al.

(10) Patent No.: US 8,557,203 B2
(45) Date of Patent: Oct. 15, 2013

(54) ARCHITECTURAL DIESEL OXIDATION CATALYST FOR ENHANCED $NO_2$ GENERATOR

(75) Inventors: Owen Herman Bailey, Lake Orion, MI (US); Matthew Hedgecock, Farmington Hills, MI (US); Frank-Walter Schuetze, Halbach (DE); Anke Woerz, Frankfurt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 137 days.

(21) Appl. No.: 12/611,440

(22) Filed: Nov. 3, 2009

(65) Prior Publication Data

US 2011/0099975 A1    May 5, 2011

(51) Int. Cl.

| | |
|---|---|
| *B01D 50/00* | (2006.01) |
| *B01D 53/56* | (2006.01) |
| *B01D 53/94* | (2006.01) |
| *B01J 8/02* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |
| *B01J 23/00* | (2006.01) |
| *B01J 21/00* | (2006.01) |

(52) U.S. Cl.
USPC ................ 423/213.5; 423/239.1; 423/239.2; 422/170; 422/177; 422/180; 502/66; 502/74; 502/262; 502/302; 502/303; 502/304; 502/332; 502/333; 502/334; 502/339; 502/349; 502/350; 502/351; 502/355; 502/415; 502/439; 502/527.12; 502/527.13; 502/527.19

(58) Field of Classification Search
USPC ............. 502/66, 74, 262, 302–304, 332–334, 502/339, 349–351, 355, 415, 439, 527.12, 502/527.13, 527.19; 423/213.5, 239.1, 423/239.2; 422/170, 177, 180
See application file for complete search history.

(56) References Cited

U.S. PATENT DOCUMENTS

| 2,125,231 A | 7/1938 | Hurst |
| 4,740,292 A | 4/1988 | Chen et al. |

(Continued)

FOREIGN PATENT DOCUMENTS

| DE | 39 40 758 | 6/1991 |
| DE | 44 35 073 | 4/1995 |

(Continued)

OTHER PUBLICATIONS

Gerard Tuenter, et al., "Kinetics and Mechanism of the $NO_x$ Reduction with $NH_3$ on $V_2O_5$-$WO_3$-$TiO_2$ Catalyst", Ind. Eng. Chem. Prod. Res. Dev., 1986, 25, pp. 633-636.

(Continued)

*Primary Examiner* — Cam N. Nguyen
(74) *Attorney, Agent, or Firm* — Smith, Gambrell and Russell, LLP.

(57) ABSTRACT

A device is described which provides thermally durable $NO_2$ generation in conjunction with efficient heat-up performance for filter regeneration, and low temperature HC (hydrocarbon) and CO activity. Importantly, it provides both functions while minimizing PGM (platinum group metals) utilization and its associated impact on catalyst cost.

20 Claims, 13 Drawing Sheets

Hot HD-FTP Tests: $NO_2$ Formation
$NO_2$/NOx Ratio

(56) References Cited

U.S. PATENT DOCUMENTS

| | | | |
|---|---|---|---|
| 4,961,917 A | 10/1990 | Byrne | |
| 5,010,051 A * | 4/1991 | Rudy | 502/304 |
| 5,332,554 A | 7/1994 | Yasaki | |
| 5,371,056 A | 12/1994 | Leyrer et al. | |
| 5,439,865 A * | 8/1995 | Abe et al. | 502/333 |
| 5,462,907 A | 10/1995 | Farrauto et al. | |
| 5,525,307 A | 6/1996 | Yasaki | |
| 5,597,771 A | 1/1997 | Hu et al. | |
| 5,627,124 A | 5/1997 | Farrauto et al. | |
| 5,744,103 A | 4/1998 | Yamada et al. | |
| 5,824,621 A * | 10/1998 | Abe et al. | 502/305 |
| 5,928,981 A | 7/1999 | Leyrer et al. | |
| 6,087,298 A * | 7/2000 | Sung et al. | 502/333 |
| 6,153,160 A | 11/2000 | Voss et al. | |
| 6,274,107 B1 | 8/2001 | Yavuz et al. | |
| 6,342,465 B1 | 1/2002 | Klein et al. | |
| 6,375,910 B1 * | 4/2002 | Deeba et al. | 423/239.1 |
| 6,756,336 B2 | 6/2004 | Kasahara et al. | |
| 6,764,665 B2 | 7/2004 | Deeba et al. | |
| 6,767,855 B2 | 7/2004 | Kasahara et al. | |
| 6,805,849 B1 | 10/2004 | Andreasson et al. | |
| 6,843,971 B2 | 1/2005 | Schäfer-Sindlinger et al. | |
| 6,914,026 B2 | 7/2005 | Tran et al. | |
| 7,005,116 B2 | 2/2006 | Schäfer-Sindlinger et al. | |
| 7,022,646 B2 * | 4/2006 | Li | 502/339 |
| 7,071,141 B2 * | 7/2006 | Gandhi et al. | 502/302 |
| 7,078,004 B2 | 7/2006 | Voss et al. | |
| 7,084,086 B2 | 8/2006 | Kasahara et al. | |
| 7,210,288 B2 | 5/2007 | Bandl-Konr et al. | |
| 7,313,911 B2 | 1/2008 | Pfeifer et al. | |
| 7,329,629 B2 * | 2/2008 | Gandhi et al. | 502/325 |
| 7,374,729 B2 | 5/2008 | Chen et al. | |
| 7,501,098 B2 | 3/2009 | Chen et al. | |
| 7,506,504 B2 | 3/2009 | Kumar | |
| 7,517,826 B2 | 4/2009 | Fujdala et al. | |
| 7,550,124 B2 | 6/2009 | Chen et al. | |
| 7,576,031 B2 * | 8/2009 | Beutel et al. | 502/339 |
| 7,749,472 B2 * | 7/2010 | Chen et al. | 423/213.2 |
| 7,772,151 B2 * | 8/2010 | Li et al. | 502/339 |
| 7,795,172 B2 * | 9/2010 | Foong et al. | 502/327 |
| 7,824,639 B2 * | 11/2010 | Moroz et al. | 423/246 |
| 7,842,643 B2 * | 11/2010 | Yabuzaki et al. | 502/303 |
| 7,846,865 B2 * | 12/2010 | Yamato et al. | 502/327 |
| 7,875,250 B2 * | 1/2011 | Nunan | 422/177 |
| 7,875,573 B2 * | 1/2011 | Beutel et al. | 502/339 |
| 7,906,454 B2 * | 3/2011 | Wolf et al. | 502/327 |
| 7,923,408 B2 * | 4/2011 | Takahashi et al. | 502/327 |
| 7,947,238 B2 * | 5/2011 | Deeba | 423/213.2 |
| 7,976,784 B2 * | 7/2011 | Liu et al. | 422/177 |
| 7,977,275 B2 * | 7/2011 | Pfeifer et al. | 502/325 |
| 7,998,896 B2 * | 8/2011 | Kitamura et al. | 502/326 |
| 8,211,392 B2 | 7/2012 | Grubert et al. | |
| 8,246,923 B2 | 8/2012 | Southward et al. | |
| 8,252,258 B2 | 8/2012 | Müller-Stach et al. | |
| 2002/0039550 A1 | 4/2002 | Schäfer-Sindlinger et al. | |
| 2002/0048542 A1 | 4/2002 | Deeba et al. | |
| 2003/0021745 A1 * | 1/2003 | Chen | 423/239.1 |
| 2003/0086851 A1 | 5/2003 | Dou | |
| 2003/0103886 A1 | 6/2003 | Dou | |
| 2003/0108465 A1 | 6/2003 | Voss et al. | |
| 2003/0158037 A1 | 8/2003 | Foong et al. | |
| 2003/0175192 A1* | 9/2003 | Hu et al. | 423/239.1 |
| 2004/0001781 A1 | 1/2004 | Kumar et al. | |
| 2004/0110628 A1 | 6/2004 | Kasahara | |
| 2004/0151645 A1 | 8/2004 | Li | |
| 2004/0198595 A1 | 10/2004 | Chen | |
| 2004/0254061 A1 | 12/2004 | Dou | |
| 2005/0045405 A1 | 3/2005 | Yugo et al. | |
| 2005/0164879 A1 | 7/2005 | Chen | |
| 2005/0196333 A1 | 9/2005 | Schafer-Sindlinger et al. | |
| 2005/0227867 A1 | 10/2005 | Chen et al. | |
| 2005/0266988 A1* | 12/2005 | Doumeki et al. | 502/339 |
| 2006/0153761 A1 | 7/2006 | Bandl-Konrad et al. | |
| 2007/0051096 A1 | 3/2007 | Pfeifer et al. | |
| 2007/0089403 A1 | 4/2007 | Pfeifer et al. | |
| 2007/0175208 A1 | 8/2007 | Bandl-Konrad et al. | |
| 2007/0277507 A1 | 12/2007 | Yan | |
| 2007/0277513 A1 | 12/2007 | Yoshida et al. | |
| 2008/0020922 A1* | 1/2008 | Li et al. | 502/73 |
| 2008/0038172 A1 | 2/2008 | Chen et al. | |
| 2008/0042104 A1 | 2/2008 | Chen et al. | |
| 2008/0044329 A1 | 2/2008 | Chen et al. | |
| 2008/0044330 A1 | 2/2008 | Chen et al. | |
| 2008/0045405 A1 | 2/2008 | Beutel et al. | |
| 2008/0066458 A1 | 3/2008 | Toyoda et al. | |
| 2008/0119353 A1 | 5/2008 | Jia et al. | |
| 2008/0120970 A1 | 5/2008 | Hilgendorff et al. | |
| 2008/0286184 A1 | 11/2008 | Ando et al. | |
| 2009/0129995 A1 | 5/2009 | Pfeifer et al. | |
| 2009/0151341 A1 | 6/2009 | Kim et al. | |
| 2009/0169451 A1 | 7/2009 | Andreasson et al. | |
| 2009/0193796 A1 | 8/2009 | Wei et al. | |
| 2009/0239745 A1 | 9/2009 | Yamato et al. | |
| 2009/0257933 A1 | 10/2009 | Chen et al. | |
| 2009/0320457 A1 | 12/2009 | Wan | |
| 2010/0048384 A1 | 2/2010 | Fujdala et al. | |
| 2010/0058746 A1 | 3/2010 | Pfeifer et al. | |
| 2010/0062930 A1 | 3/2010 | Sato et al. | |
| 2010/0095658 A1 | 4/2010 | Spurk | |
| 2010/0111796 A1 | 5/2010 | Caudle et al. | |
| 2010/0183490 A1 | 7/2010 | Hoke et al. | |
| 2010/0221161 A1 | 9/2010 | Schneider et al. | |
| 2010/0257843 A1 | 10/2010 | Hoke | |
| 2011/0099975 A1 | 5/2011 | Bailey et al. | |
| 2011/0120093 A1 | 5/2011 | Eckhoff | |

FOREIGN PATENT DOCUMENTS

| | | |
|---|---|---|
| DE | 196 14 540 | 10/1997 |
| DE | 197 34 627 | 1/1999 |
| DE | 197 53 738 | 6/1999 |
| DE | 103 08 288 | 9/2004 |
| DE | 10 2004 040549 | 2/2006 |
| DE | 10 2007 060 623 | 6/2009 |
| EP | 0 385 164 | 9/1990 |
| EP | 0 427 970 | 5/1991 |
| EP | 0 800 856 | 10/1997 |
| EP | 1 046 423 | 10/2000 |
| EP | 1054722 | 11/2000 |
| EP | 1 072 764 | 1/2001 |
| EP | 1 147 801 | 10/2001 |
| EP | 1 495 804 | 1/2005 |
| EP | 2 112 339 A1 | 10/2009 |
| JP | 63-084635 | 4/1988 |
| WO | 95/35152 | 12/1995 |
| WO | 01/02083 | 1/2001 |
| WO | 01/74476 | 10/2001 |
| WO | 02/14657 | 2/2002 |
| WO | 03/035256 | 5/2003 |
| WO | 2004/061278 | 7/2004 |
| WO | 2004/071646 | 8/2004 |
| WO | 2004/076829 | 9/2004 |
| WO | 2005/031132 | 4/2005 |
| WO | 2006/021336 | 3/2006 |
| WO | 2007/048971 | 5/2007 |
| WO | 2008/101585 | 8/2008 |
| WO | 2010/083357 A2 | 7/2010 |

OTHER PUBLICATIONS

Stephan Liebsch, "Katalytische Partikeloxidation im Kontext von Harnstoff-SCR and Partikelkonfektionierung", TU Dresden, 2004, pp. 1-179.

Konieczny et al., Pre-Turbocharger-Catalyst-Catalytic performances on an Euro V type Diesel engine and robust design development, 2008-01-0768, SAE World Congress, Detroit, Michigan, Apr. 14-17, 2008.

International Search Report for PCT/EP2009/002101, mailed Jun. 15, 2009.

Written Opinion for PCT/EP2009/002101, mailed Jun. 15, 2009.

PCT Notification Concerning Transmittal of International Preliminary Examination Report on Patentability (Form PCT/IB/326) mailed Dec. 2, 2010 for Application No. PCT/EP2008/008995.

(56) References Cited

OTHER PUBLICATIONS

PCT International Preliminary Report on Patentability (Form PCT/IB/373) issued Nov. 23, 2010 for Application No. PCT/EP2008/008995 (in English language).
English translation of the PCT Written Opinion of the International Searching Authority (Form/ISA/237) issued Nov. 23, 2010 for Application No. PCT/EP2008/008995 w/ English language translation.
International Search report for Application No. PCT/EP2008/008995 dated Feb. 17, 2009 (in English language).
U.S. Appl. No. 12/226,857, Schneider, et al.
International Search Report mailed in PCT/EP2010/002904, dated Aug. 30, 2010.
Abdennour Bourane, et al., "Oxidation of CO on a PT/AL2O3 Catalyst: From the Surface Elementary Steps to Light-Off Tests, V. Experimental and Kinetic Model for Light-Off Tests in Excess of O2", Journal of Catalysis vol. 222 (2004), pp. 499-510.
R. Burch, et al., "An Investigation Into the Reactivity, Deactivation, and in Situ Regeneration of PT-Based Catalysts for the Selective Reduction of NOx Under Lean Burn Conditions", Journal of Catalysis 182, pp. 234-243 (1999).
R. Burch, et. al., "Selective Reduction of Nitrogen Oxides by Hydrocarbons Under Lean-Burn Conditions Using Supported Platinum Group Metal Catalysts", Catalysis Today vol. 26 (1995), pp. 185-206.
M. Chen, et al., "Morphology and Composition of PT-PD Alloy Crystallites on SiO2 in Reactive Atmospheres", Journal of Catalysis vol. 56, pp. 198-218 (1979).
Ronald M. Heck, et al., "Automobile Exhaust Catalysts", Applied Catalysis A: General vol. 221 (2001), pp. 443-457.
J.A.A. van den Tillaart, et al., "Effect of Support Oxide and Noble Metal Precursor on the Activity of Automative Diesel Catalysts", Applied Catalysis B: Environmental vol. 10 (1996), pp. 53-68.
Manufacturers of Emission Controls Association (MECA), "The Impact of Sulfur in Diesel Fuel on Catalyst Emission Control Technology", Mar. 15, 1999, pp. 1-25.
A. Morlang, et al., "Bimetallic PT/PD Diesel Oxidation Catalysts Structural Characterisation and Catalytic Behaviour", Applied Catalysis B: Environmental vol. 60 (2005), pp. 191-199.
Official Journal of the European Union, "Regulations", Regulation (EC) No. 715/2007 of the European Parliament and of the Council of Jun. 20, 2007 on type approval of motor vehicles with respect to emissions from light passenger and commercial vehicles (Euro 5 and Euro 6) and on access to vehicle repair and maintenance information; pp. L171/1-16.
Martyn V. Twigg, "Progress and Future Challenges in Controlling Automotive Exhaust Gas Emissions", Applied Catalysis B: Environmental, (2007) vol. 70 pp. 1-4.

\* cited by examiner

DOC Designs

| Type | front zone g/ft³ | Pt/Pd | rear zone g/ft³ | Pt/Pd | overall g/ft³ | Pt/Pd | substrate cpsi/mil | aging |
|---|---|---|---|---|---|---|---|---|
| Umicore | 55 | 2:1 | 15 | 2:1 | 35 | 2:1 | 400/4 | 300 hours |
| Umicore | 55 | 4:1 | 15 | 4:1 | 35 | 4:1 | 400/4 | 300 hours |
| Umicore | 55 | 1:1 | 15 | 1:1 | 35 | 1:1 | 400/4 | 300 hours |
| Umicore | 55 | 1:1 | 15 | 10:1 | 35 | 1.4:1 | 400/4 | 300 hours |

7.5" x 5.2" (400/4) substrates

FIG. 1

Dual DOC Aging Cycle

Dual In-exhaust Injection

Histograms for 1200 Cycles of Aging (C)DPF includes catalyzed and uncatalyzed filter substrates of all types
SCR includes all types of formulations including V, Fe, Cu, etc.

LNT = NOx Adsorber or Lean NOx Trap

ARCHITECTURAL DIESEL OXIDATION CATALYST FOR ENHANCED $NO_2$ GENERATOR

INTRODUCTION AND BACKGROUND

The generation of $NO_2$ has become important for the passive regeneration of diesel particulate filters, as well as the enhancement of low temperature SCR ("Selection Catalytic Reduction") activity. The low temperature activity of conventional diesel oxidation catalysts (DOC) has been derived from the incorporation of platinum group metals (PGM), typically Pt or Pd. With improvements in fuel quality, specifically, the increased availability of ultra low sulfur diesel, the formation of sulfate over highly active DOCs has become less of an issue. As a result, improvements in low temperature activity for HC and CO oxidation could be obtained by increasing PGM loading. Because of cost advantages associated with Pd relative to Pt, utilization of higher Pd levels in DOC formulations has become common. It has also been recognized that Pd is effective in the thermal stabilization of Pt, enhancing the performance of a mixture following high temperature aging. Although Pd can be used effectively for the oxidation of HC and CO, it is not nearly as effective as Pt for the oxidation of NO to $NO_2$. In mixtures of Pt and Pd, the efficiency of NO oxidation is found to decrease with decreasing Pt/Pd ratio.

With the adoption of stricter emission regulations forcing a significant reduction in NOx emissions, advanced diesel combustion strategies have been developed to minimize NOx levels from the engine. Unfortunately, many of these combustion strategies also result in higher engine-out levels of CO and HC, as well as lower exhaust temperatures. This combination has driven the need for lower DOC light-off temperatures to manage CO and HC emissions. This in turn has further increased the use of DOCs with high PGM loadings, with an associated increase in the cost of the DOC.

At the same time, stricter emission regulations are forcing the incorporation of particulate filters to control PM emissions. In many applications, DOCs are being utilized to oxidize NO to $NO_2$. The generated $NO_2$ then serves as an effective low temperature oxidant for soot. As with the oxidation of CO and HC, generation of a higher fraction of $NO_2$ in the exhaust stream is benefited by higher PGM loadings, with again an associated increase in the cost of the DOC.

Because advanced combustion strategies often result in lower engine-out NOx levels while maintaining or even increasing the levels of engine-out particulate, the availability of $NO_2$ to "passively" combust soot at a rate sufficient to prevent accumulation of unacceptable levels of soot within a filter (i.e. unacceptable engine back pressure and associated fuel economy penalty) requires the utilization of other measures to combust the accumulated soot. This type of "desooting" process often referred to as active regeneration can be accomplished by heating the soot accumulated within the filter to the point where oxygen is able to efficiently combust the soot. In many applications, DOCs are being utilized to generate the heat necessary to initiate combustion of the trapped particulate. This in turn has increased the thermal durability requirement of DOCs. Again, this has often resulted in the requirement for an increased PGM loading in order to obtain sufficient low temperature performance in the aged state.

Importantly, there is also a fuel economy penalty associated with the heat generation associated with active filter regeneration. As a result, even though passive filter regeneration may be insufficient by itself to prevent soot accumulation from reaching a point where active filter regeneration is required, the combustion of particulate with $NO_2$ can reduce the rate of soot accumulation. This reduction in soot accumulation rate reduces the frequency at which active regeneration is required, and as a result, lowers the fuel economy penalty associated with filter operation. Again, this drives the use of DOCs with high PGM loadings, and specifically a higher Pt fraction to increase $NO_2$, with an associated increase in the cost of the DOC.

As a result of the tradeoffs in Pt and Pd cost and performance, numerous optimization studies have been conducted in an effort to minimize PGM cost contribution to DOC while maintaining or improving system performance. The application of two catalyst combinations, the first containing high PGM loading and the second containing low PGM loading is known. It is also known that zones or bands of high and low PGM loading can be applied to a single catalyst substrate, providing activity similar to that of two catalyst combinations. Both types of configurations are depicted in FIG. 11. It is also known in the art, that different PGM ratios can be applied in these two catalyst combinations or zoned/banded catalyst designs. While these designs have provided improved activity for HC and CO performance, to date, these designs have had limited success in simultaneously enhancing $NO_2$ generation while minimizing PGM cost.

Devices are known for the purification of diesel exhaust gases, which devices comprise, in the flow direction of the exhaust gas, an oxidation catalyst, a diesel particulate filter with catalytically active coating, and, downstream of a device for introducing a reducing agent from an external reducing agent source, an SCR ("selective catalytic reduction") catalyst.

The untreated exhaust gas of diesel engines contains, in addition to carbon monoxide CO, hydrocarbons HC and nitrogen oxides NOx, a relatively high oxygen content of up to 15% by volume. The untreated exhaust gas also contains particulate emissions which are composed predominantly of soot residues and possible organic agglomerates which arise from incomplete fuel combustion in the cylinder.

Adhering to future legal exhaust gas limits for diesel vehicles in Europe, North America and Japan necessitates the simultaneous removal of particulates and nitrogen oxides from the exhaust gas. The harmful gases carbon monoxide and hydrocarbons from the relatively lean exhaust gas can easily be made harmless by oxidation at a suitable oxidation catalyst. Diesel particulate filters with and without an additional catalytically active coating are suitable units for the removal of the particulate emissions. On account of the high oxygen content, the reduction of the nitrogen oxides to form nitrogen ("denitrogenization" of the exhaust gas) is more difficult. A known method is selective catalytic reduction (SCR) of the nitrogen oxides at a suitable catalyst.

This method is presently the preferred option for the denitrogenization of diesel engine exhaust gases. The reduction of the nitrogen oxides contained in the exhaust gas takes place in the SCR method with the aid of a reducing agent which is introduced into the exhaust stream in a dosed fashion from an external source. As reducing agent, use is preferably made of ammonia or of a compound which releases ammonia, such as for example urea or ammonium carbamate. The ammonia, which is possibly generated in situ from the precursor compound, reacts at the SCR catalyst with the nitrogen oxides from the exhaust gas in a comproportionation reaction to form nitrogen and water.

Another suitable method for the denitrogenization of diesel engine exhaust gases utilizes a catalyst which is capable of storing NOx during oxygen rich operating conditions and releasing and reducing the stored NOx during short periods of fuel rich operation. Such devices are known as NOx adsorbers or lean NOx traps (LNTs).

At present, in order to satisfy the upcoming legal standards, a combination of the different exhaust gas purification units is inevitable. A device for the purification of diesel engine exhaust gases must comprise at least one oxidationally active catalytic converter and, for denitrogenization, an SCR catalyst with an upstream device for introducing reducing agent (preferably ammonia or urea solution) and an external reducing agent source (for example an auxiliary tank with urea solution or an ammonia store), or an LNT. If it is not possible by optimizing the combustion within the engine to keep the particulate emissions sufficiently low that they can be removed by means of the oxidation catalyst by direct oxidation with oxygen, the use of a particulate filter is additionally necessary.

Corresponding exhaust gas purification systems have already been described; some are presently at the practical testing stage, others are already commercially practiced.

For example, EP-B-1 054 722 describes a system for the treatment of NO and particulate-containing exhaust gases in which system an oxidation catalyst is connected upstream of a particulate filter. Arranged at the outflow side of the particulate filter are a reducing agent source and a dosing device for the reducing agent, and an SCR catalyst. In the method described in EP-B-1 054 722, the $NO_2$ proportion in the exhaust gas and therefore the $NO_2/NO$ ratio is increased by means of the at least partial oxidation of NO at the oxidation catalyst, with the $NO_2/NO$ ratio preferably being set to a predetermined level which is an optimum for the SCR catalyst.

The $NO_2/NO$ ratio which is an optimum for the SCR catalyst is 1 for all presently known SCR catalysts. If the NOx contained in the exhaust gas is composed only of NO and $NO_2$, then the optimum $NO_2/NO_x$ ratio is between 0.3 and 0.7, preferably between 0.4 and 0.6 and is particularly preferably 0.5. Whether said ratio is attained upstream of the SCR catalyst in a system according to EP-B-1 054 722 is dependent on the exhaust gas temperature and therefore on the operating state of the engine, on the activity of the oxidation catalyst and on the design and soot loading of the diesel particulate filter which is connected downstream of the oxidation catalyst.

The untreated exhaust gas of conventional diesel engines contains only a very low proportion of $NO_2$ in the $NO_x$. The main proportion of the nitrogen oxides is nitrogen monoxide NO. As said untreated gas passes over the oxidation catalyst, NO is at least partially oxidized to form $NO_2$. The rate of $NO_2$ formation is dependent on the activity of the oxidation catalyst and on the exhaust gas temperature. If a significant quantity of soot is deposited on the diesel particulate filter which is arranged at the outflow side, then the $NO_2$ proportion present in the NO downstream of the oxidation catalyst is, with sufficient exhaust gas temperature, further reduced. Since NO is predominantly formed from the $NO_2$ during the oxidation of soot with $NO_2$ essentially no denitrogenization of the exhaust gas takes place. As a result, denitrogenization must take place by means of the downstream SCR catalyst, for which purpose the $NO_2/NO_x$ ratio must be set to an optimum value over the entirety of oxidation catalyst and diesel particulate filter. EP-B-1 054 722, however, does not provide any technical teaching as to how the setting of the $NO_2/NO_x$ ratio in the exhaust gas upstream of the SCR catalyst can be realized over the entirety of the oxidation catalyst and filter.

A further problem which is not discussed in EP-B-1 054 722 but which occurs in practice is that the "passive" particulate filter regeneration which takes place in the system, that is to say the burning of soot, which takes place in situ, by oxidation with $NO_2$ generated by means of the oxidation catalyst, is generally not sufficient on its own to prevent the particulate filter from becoming clogged with soot, with a resulting rise in exhaust gas back pressure to unacceptable values. Applied auxiliary measures are necessary, which may be carried out by means of for example, additional "active" diesel particulate filter regenerations when the pressure drop across the particulate filter exceeds a critical threshold value.

The auxiliary measures include the additional injection of fuel into the exhaust stream upstream of the oxidation catalyst or into the cylinders of the combustion chamber during the exhaust piston stroke. The unburned fuel which passes into the exhaust gas from time to time by means of said device is burned across the oxidation catalyst with the release of heat; the oxidation catalyst is used as a "heating catalyst" in order to heat the downstream diesel particulate filter to temperatures which lie considerably above the soot ignition temperature in the oxygen-containing atmosphere, that is to say in the range from 500 to 650° C. As a result of the temperature rise which is obtained in this way, the soot particles are "burned off" with the oxygen contained in the exhaust gas.

In order that the oxidation catalyst can operate as a "heating catalyst" in the "active" diesel particulate filter regeneration, the oxidation catalyst must meet some demands with regard to conversion behaviour and ageing stability. The oxidation catalyst must be able to convert high quantities of unburned hydrocarbons by oxidation in a short time without the oxidation reaction thereby being "flooded" and thus ceasing. This is also sometimes referred to as quenching of the catalyst. Here, the conversion of the unburned hydrocarbons must be as complete as possible, since the breakthrough of unburned hydrocarbons through the oxidation catalyst can lead to the contamination of the SCR catalyst which is arranged further downstream. A breakthrough of unburned hydrocarbons at the end of the exhaust system may also have the result that the legal limits are not adhered to. The more fuel can be burned completely across the oxidation catalyst, the more flexible can be the strategy for active regeneration. Furthermore, it is an important requirement that the oxidation catalyst "ignites" even at low exhaust gas temperatures (180 to 250° C.).

An oxidation catalyst which is also ideally suitable as a heating catalyst must therefore provide very high HC conversion rates even at extremely low exhaust gas temperatures, wherein the HC conversion should increase as abruptly as possible to maximum values once the "ignition temperature" (light-off temperature) is reached. Furthermore, the catalyst must be sufficiently stable with regard to ageing that its activity is not impaired to too great an extent as a result of the exothermic energy generated during the combustion of the hydrocarbons. The performance demands are referred to below in summary as "heat-up performance".

The present invention is intended to provide an exhaust gas purification zoned catalyst system, in which the oxidation catalyst exhibits the best possible "heat-up performance" in the case of an "active" particulate filter regeneration.

SUMMARY OF THE INVENTION

The invention disclosed herein is a zoned catalyst design which provides thermally durable $NO_2$ generation in conjunction with efficient heat-up performance for filter regeneration, and low temperature HC (hydrocarbon) and CO activity. Importantly, it provides both functions while minimizing PGM (platinum group metals) utilization and its associated impact on catalyst cost. It has been discovered that a higher loaded leading catalyst with low Pt/Pd ratio followed by a lower loaded trailing catalyst with high Pt/Pd ratio surprisingly yields the desired balanced performance.

This type of DOC ("Diesel Oxidation Catalyst") performance can be utilized in stand-alone DOC+CDPF (catalyzed diesel particulate filter) systems, or as part of larger systems which incorporate SCR (Selective Catalytic Reduction) or LNT (Lean $NO_x$ trap) catalysts where increased $NO_2$ availability is desirable. Such designs include DOC+(C)DPF+SCR, DOC+SCR+(C)DPF, DOC+SCR+SCRFilter, DOC+SCRFilter, DOC+SCRFilter+SCR, DOC+LNT, DOC+LNT+(C)DPF, DOC+LNT+(C)DPF+SCR, and DOC+LNT+SCR+(C)DPF as illustrated in FIGS. 12 and 13. All of these systems are meant to reflect component order, and for SCR systems, incorporate appropriate urea/$NH_3$ precursor injection unless preceded by an LNT which can generate $NH_3$, and for HC injection (including vaporizers) for (C)DPF regeneration, $HC/CO/H_2$ injection for reformers, and the like. Incorporation of additional downstream components for slip control of HC, CO, $NH_3$, and $H_2S$ are also optionally incorporated.

As described herein, the relative cost and performance of zoned catalysts with Pt/Pd ratios of 4:1, 2:1, 1:1, and 1:1/10:1 (1.4:1 overall) DOCs are compared. In each case, catalysts were prepared by zoning equal lengths of a substrate with 55 g/ft$^3$ in the front zone and 15 g/ft$^3$ in the rear zone PGM loadings. The Pt/Pd ratios were equivalent on front and rear zones except for the 1.4:1 sample illustrating the invention. Charts indicate that the 1.4:1 design, following ageing, provides equivalent light-off performance for HC over Hot HD (Heavy Duty)-FTP (Federal Test Procedure) tests (HC conversion), equivalent heat-up performance during HD-FTP and SET (Supplemental Emission Test) tests where active regenerations were triggered (generate elevated DOC-out temperature with similar HC slip level), and superior NO oxidation activity ($NO_2$/NOx ratios) over HD-FTP and SET tests.

The objects of the invention are achieved by a device for the purification of diesel exhaust gases, which device is characterized by a zoned catalyst architecture and which comprises, in the flow direction of the exhaust gas, a leading oxidation catalyst and, immediately following, a trailing oxidation catalyst. The expression "immediately following" is intended to make clear that there is no other type of filter or material located between the leading and trailing catalysts.

More particularly, applicants' device for the purification of diesel exhaust gases comprises, in the flow direction of the exhaust gas, as a leading catalyst a first oxidation catalyst disposed on a carrier substrate and as a trailing catalyst immediately following the leading catalyst, a second oxidation catalyst disposed on a carrier substrate wherein the first and second oxidation catalysts contain platinum and palladium in their catalytically active coating, and further wherein the total quantity of platinum and palladium in the leading catalyst is high relative to the trailing catalyst, and further wherein the ratio of platinum to palladium in the leading catalyst is relatively low, and the ratio of platinum to palladium in the trailing catalyst is relatively high. The carrier substrate in each instance being a through flow substrate. The ratio of the total quantity of platinum to the total quantity of palladium is preferably between 1:8 and 15:1, where the loading of platinum:palladium in the leading oxidation catalyst is relatively high and the loading of platinum:palladium in the catalytically active coating of the trailing diesel particulate filter is relatively low.

The first and the second oxidation catalysts can consist of a platinum- and palladium-containing catalytically active coating on a ceramic or metal throughflow honeycomb body.

Optionally, there may also be present a device for introducing a reducing agent from an external reducing agent source, and an SCR catalyst. In this case, the trailing oxidation catalyst of the zoned DOC would be located upstream of the injection point for the external reducing agent. Similar arrangements to those below apply if an alternative NOx control device, an LNT, is applied in place of an SCR catalyst since the activities of both devices are dependent upon $NO_2$ availability.

In the upstream position, $NO_2$ production from the DOC feeds directly into the exhaust feeding the inlet of the SCR. This inlet concentration controls the activity of the SCR catalyst as previously discussed. Because the SCR catalyst largely converts the NOx, $NO_2$ availability for passive soot combustion is limited. In this case, PGM loading level and type within any downstream filter catalytic coating is not dictated by $NO_2$ formation, but by other parameters such as cost and oxygen-based soot combustion rate.

In WO 2009/140989 (see also U.S. Pat. No. 8,057,768) there is shown a particulate filter in a downstream position. $NO_2$ production from the DOC feeds directly into the exhaust feeding the inlet of the filter. This inlet concentration contributes to the rate of passive soot combustion over the filter. The $NO_2$ concentration at the outlet of the filter is dependent upon the inlet concentration, the soot loading within the filter, the temperature, and the PGM loading and composition on the filter, and contributes to the activity of the downstream NOx control catalyst.

In the present invention, the carrier substrate for the oxidation catalysts are through flow substrates composed of ceramic materials such as silicon carbide, cordierite, aluminum titanate, and mullite. Metallic throughflow substrates can also be used.

The oxidation catalyst is applied to one or more oxidic support materials selected from the group consisting of aluminum oxide, lanthanum-oxide-stabilized aluminum oxide, aluminosilicate, silicon dioxide, titanium dioxide, cerium oxide, cerium-zirconium mixed oxides, rare-earth-metal sesquioxide, zeolite and mixtures thereof. The oxidation catalyst plus the oxidic support or wash coat is then applied to the throughflow carrier substrate.

It is desired to obtain as optimum an $NO_2/NO_x$ ratio as possible in the majority of operating states, which are typical for diesel vehicles, in which a significant nitrogen oxide content is present in the exhaust gas to be purified. Also, it is desired that the oxidation catalyst has a sufficiently good "heat-up performance" in order to permit an "active" diesel filter regeneration at important operating points.

It is known that oxidation catalysts with high levels of platinum content cause high conversion rates in diesel exhaust gases in the oxidation of NO to form $NO_2$. It is also known that oxidation catalysts which have a large amount of palladium can provide nearly complete conversion of high quantities of unburned hydrocarbons in the diesel exhaust gas even at low temperatures. Unfortunately, aged catalysts with high levels of platinum content have the tendency to quench in the event of high prevailing levels of hydrocarbon content, while palladium does not have a sufficient level of NO oxidation activity. There is a conflict of aims here between firstly the demanded NO conversion performance of a catalytic converter and secondly its "heat-up performance". For cost reasons alone, this conflict cannot be resolved by means of a simple "addition" of the two noble metals palladium and platinum in the oxidation catalyst. Additionally, these metals can interact negatively when combined or alloyed such that the "additive" effect is in fact lost.

It has been found, as explained in U.S. Pat. No. 8,057,768, that it is advantageous if a significant contribution to the formation of $NO_2$ takes place as the exhaust gas flow is conducted across the diesel particulate filter. Recent work as mentioned in U.S. Pat. No. 8,057,768 suggests that an excess expenditure in "active" particulate filter regenerations can be avoided with targeted distribution of the noble metals platinum and palladium over the oxidation catalyst and particulate filter, and a good "heat-up performance" of the oxidation catalyst can be ensured while simultaneously generating an increased $NO_2/NOx$ ratio in the exhaust gas upstream of a filter or a NOx control catalyst, while minimizing the PGM cost of said catalyst. According to U.S. Pat. No. 8,057,768, the ratio of platinum:palladium in the oxidation catalyst is preferably no greater than 6:1.

In accordance with the present invention, the ratio of platinum to palladium in the first oxidation catalyst on the leading catalyst can be varied over a wide range, preferably between 0 and 5, more preferably between 0.1 and 2 and particularly preferably between 0.3 and 1.2, and most preferably 1.0 as a result of which it is possible to provide cost-optimized exhaust systems for practically all diesel engines which are presently in use and at the testing stage and for many future diesel engine applications including a wide range of vehicles, equipment, and power generation equipment. In the second oxidation catalyst on the trailing catalyst, the ratio of platinum to palladium can be varied over a wide range, preferably between 2 and 50, more preferably between 5 and 20 and most preferably between 10 and 15.

As mentioned above, it has been found that exceptional results are obtained in the aforesaid systems when the leading oxidation catalyst has a high loading of PGM and the trailing oxidation catalyst has a lower loading of PGM.

The range of loading of platinum and palladium for the leading oxidation catalyst can be 30 to 250 g/ft$^3$ of PGM, while the range of loading of platinum and palladium for the trailing oxidation catalyst can be 5 to 100 g/ft$^3$.

The terms "leading" and "trailing" are used to denote the respective locations of the catalysts in the flow direction of the exhaust stream. Equivalent terms would be "first" and "second" or "upstream" and "downstream", respectively.

The leading oxidation catalyst and trailing oxidation catalyst can be present in the form of two separate components on two substrates forming two distinct and separated zones. Alternatively, the leading oxidation catalyst can be on the upstream side of a carrier substrate while the trailing oxidation catalyst can be located on the downstream section of the same carrier substrate. These components may possibly be accommodated in one housing, for example if only a small amount of installation space is available in the exhaust system of a diesel passenger motor vehicle. It is likewise possible for said components to be positioned in two different housings at different positions (close to the engine and/or on the underbody of the vehicle).

The first oxidation catalyst consists of a platinum- and palladium-containing catalytically active coating which is applied to a ceramic or metallic throughflow carrier substrate such as a honeycomb body. Use is preferably made of ceramic throughflow honeycomb bodies which have cell densities of 15 to 150 cells per square centimeter, particularly preferably 60 to 100 cells per square centimeter. The duct wall thickness of preferred substrates is preferably between 0.05 and 0.25 millimeters, particularly preferably between 0.07 and 0.17 millimeters.

The second oxidation catalyst consists of a platinum- and palladium containing catalytically active coating and a second ceramic or metallic throughflow carrier substrate. The second throughflow carrier substrate can be separate and distinct from the first throughflow carrier substrate or the second oxidation catalyst can be disposed on the downstream section of the first throughflow substrate with the first oxidation catalyst segregated on the upstream end thereof.

In a device according to the invention platinum and palladium are contained in a catalytically active coating in the first and second oxidation catalysts. The noble metals platinum and palladium are preferably provided on one or more oxidic support materials. They may be applied separately to, if appropriate, different support materials, or may be provided together on one or more support materials. Here, the support materials are selected from the group consisting of aluminum oxide, lanthanum-oxide-stabilized aluminum oxide, aluminosilicate, silicon dioxide, titanium dioxide, cerium oxide, cerium-zirconium mixed oxides, rare-earth-metal sesquioxide, zeolite and mixtures thereof. Aluminum oxide, lanthanum-oxide-stabilized aluminum oxide, aluminosilicate, titanium dioxide and zeolite are preferably used as support materials.

In the preferred embodiments of the two oxidation catalysts of this invention, platinum and/or palladium are provided so as to be applied to aluminum oxide and/or aluminosilicate as support material. The incorporation of zeolite within the catalytically active coating of the oxidation catalyst is dependent upon application.

The application of the noble metals to the stated, preferred support materials takes place using the conventional methods, which are known to a person skilled in the art, of injection, precipitation, immersion, the working process referred to as "incipient wetness" and other techniques known from literature. Which of the prior art methods is preferable in each case is dependent not least on the noble metal particle size which can be obtained using said methods and the target application as is known in the art.

It was observed that particularly high yields can be obtained in the NO oxidation on platinum-rich noble metal particles with a mean particle size of 5 to 10 nanometers. In order to generate such large, platinum-rich noble metal particles on the support material, it is for example possible to select a conventional precipitation-injection process using a noble metal precursor compound which sorbs only moderately on the support material. An oxidation catalyst which has a platinum:palladium ratio of no greater than 6:1, for the purification of diesel exhaust gases in applications with a very low operating temperature of the filter over the New European Driving Cycle (mean temperature in NEDC <250° C.) has been found to be useful.

For high-temperature applications or for the purification of heavily particulate-loaded exhaust gases, when frequent "active" diesel particulate filter regenerations are necessary, it is in contrast of relatively great importance that the exhaust gas purification device and therefore the exhaust gas purification units have a high level of ageing stability. The noble-metal-containing components preferred for such an application may for example be generated in that the usually oxidic support material is moistened with a suitable aqueous solution of a noble metal precursor compound, such that the pores of said support material are filled but remain free-flowing. The noble metal is then thermally fixed in the pores in a subsequent fast calcination process. The noble-metal containing powder components which result from such a process may be processed to form a coating suspension, and applied to or formed into a throughflow honeycomb body and/or filter body.

The application of the catalytically active coating to the throughflow honeycomb body takes place using the conventional dip coating process or pumping and suction coating process with subsequent thermal aftertreatment (calcination and, if appropriate, reduction with forming gas or hydrogen), which are sufficiently well-known from the prior art for these exhaust gas purification units.

All previously known SCR catalysts may be used in the device according to the invention. Particularly suitable are vanadium-oxide-based SCR catalysts and iron-exchanged and/or copper-exchanged zeolite compounds, which are known from the prior art and are commercially available. Also suitable are transition-metal-oxide-based SCR catalytic converter technologies which contain for example cerium oxides or cerium-transition-metal mixed oxides and/or tungsten oxide. This SCR catalyst coating may be applied to either flowthrough or wallflow filter substrates.

All previously known LNT catalysts may be used in the device according to the invention. Particularly suitable are NOx adsorbers based on alkali and alkaline earth NOx storage materials, which are known from the prior art and are commercially available. This catalyst coating may be applied to either flowthrough or wallflow filter substrates.

The device is suitable for the purification of diesel exhaust gases and may preferably be used in motor vehicles or other diesel powered equipment. The invention is explained in more detail below on the basis of some examples and figures herein below.

BRIEF DESCRIPTION OF THE DRAWINGS

FIG. 1 is a chart listing typical diesel oxidation catalyst designs with the "zone" configuration of the invention;

DETAILED EMBODIMENTS OF INVENTION

Engine Tests

For engine tests, various oxidation catalysts were evaluated individually or in conjunction with a common diesel particulate filter.

Figure 2:
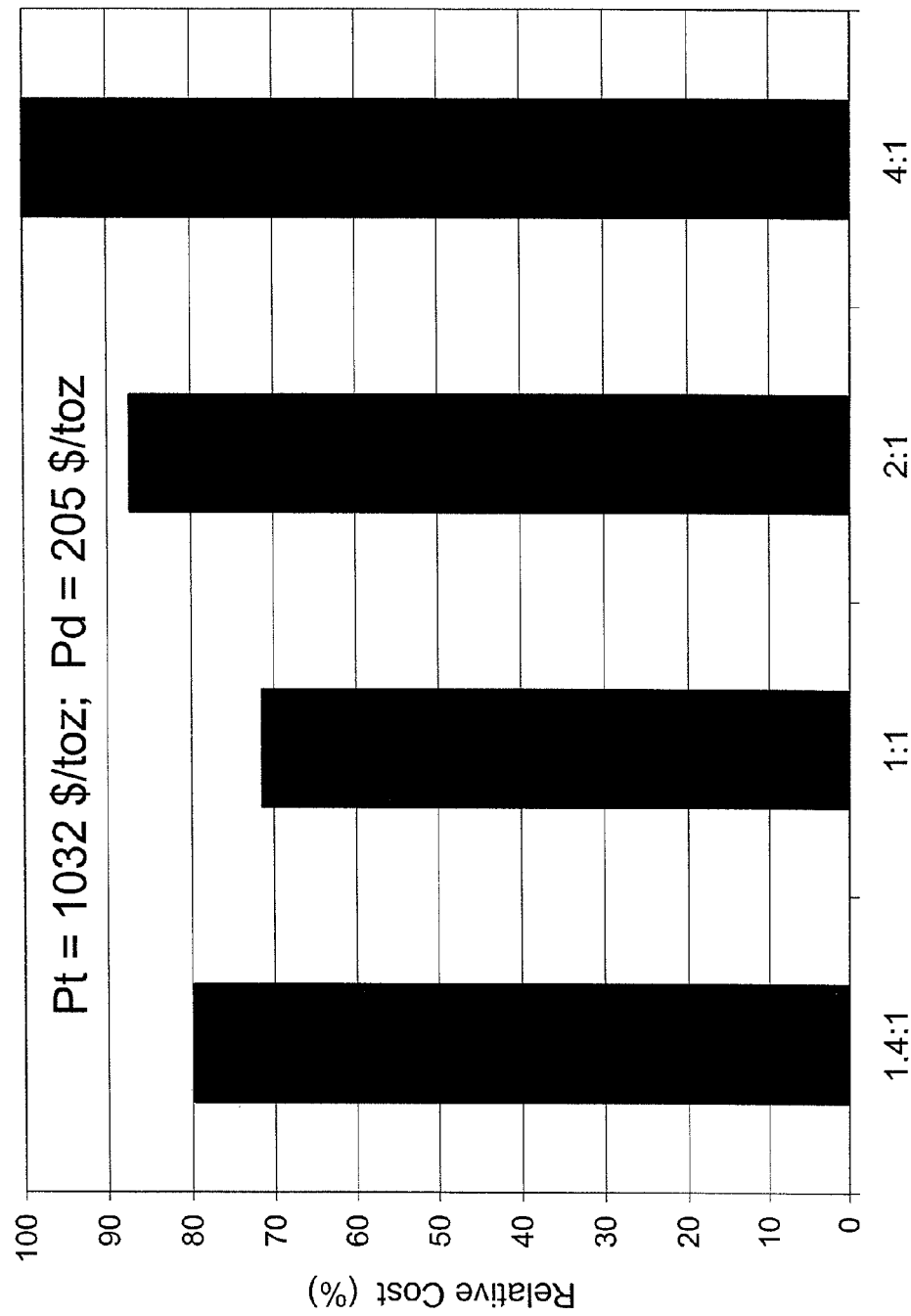
FIG. 2 is a graph depicting relative platinum group metal cost at several ratios of Pt/Pd.

PGM loadings and distributions for the different samples are summarized in FIG. 1. The total noble metal content in grams is in relation to the volume of the catalyst. Front and rear zone lengths for each sample were equivalent. Overall PGM quantities were equivalent. As a result, noble metal costs for the different devices varied. FIG. 2 shows the relative cost for the different samples for a defined Pt and Pd cost basis. Note that historically Pt has been more highly valued than Pd. As a result, at equivalent loadings, platinum-rich formulations are more costly. Catalytic coatings were applied using methods which are common to one skilled in the art.

To produce oxidation catalysts according to the invention and comparative catalysts, homogeneous silicon-aluminum mixed oxide (5% by weight $SiO_2$ in relation to the overall mass of the mixed oxide; BET surface area: 150 $m^2/g$) was slurried and milled with an aqueous solution of platinum and palladium nitrates. The resultant slurry was applied using a conventional dip coating process, to a cylindrical throughflow honeycomb body with a diameter of 7.5 inches and a length of 5.2 inches. The throughflow honeycomb body had 400 cells per square inch and a cell wall thickness of 4 mil. The resulting catalysts were dried for a duration of 4 hours at 300° C. and subsequently calcined in air at 500° C. for a duration of 2 hr.

Figure 3B:
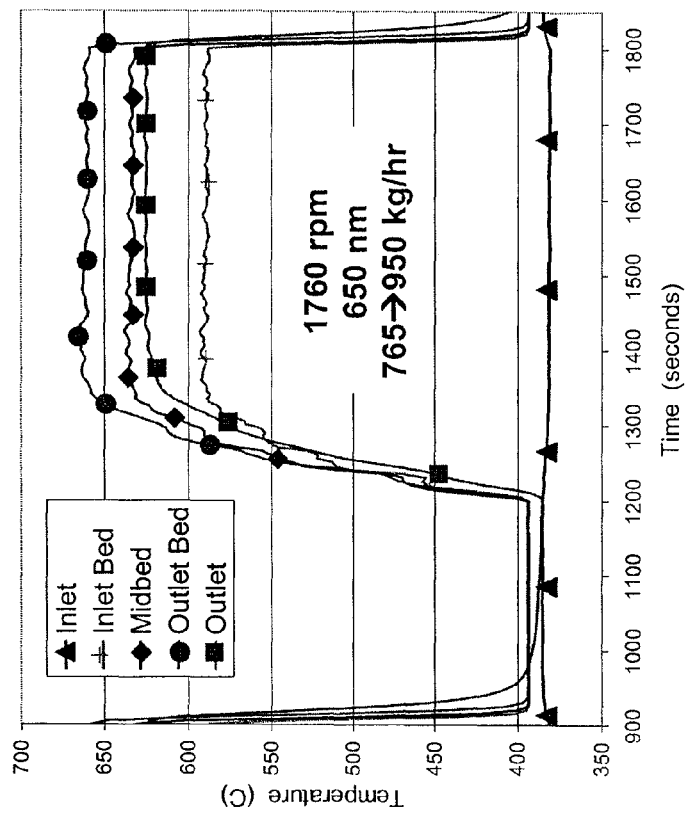
FIG. 3(b) is a graph temperature versus time.
Figure 3A:
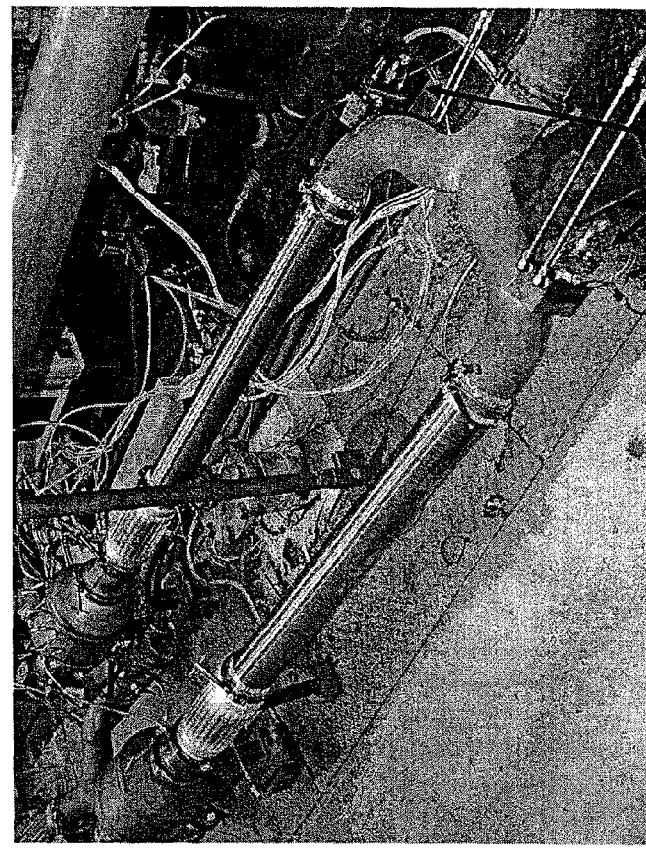
FIG. 3(a) is a set up for diesel in-exhaust injection.
Figure 4A:
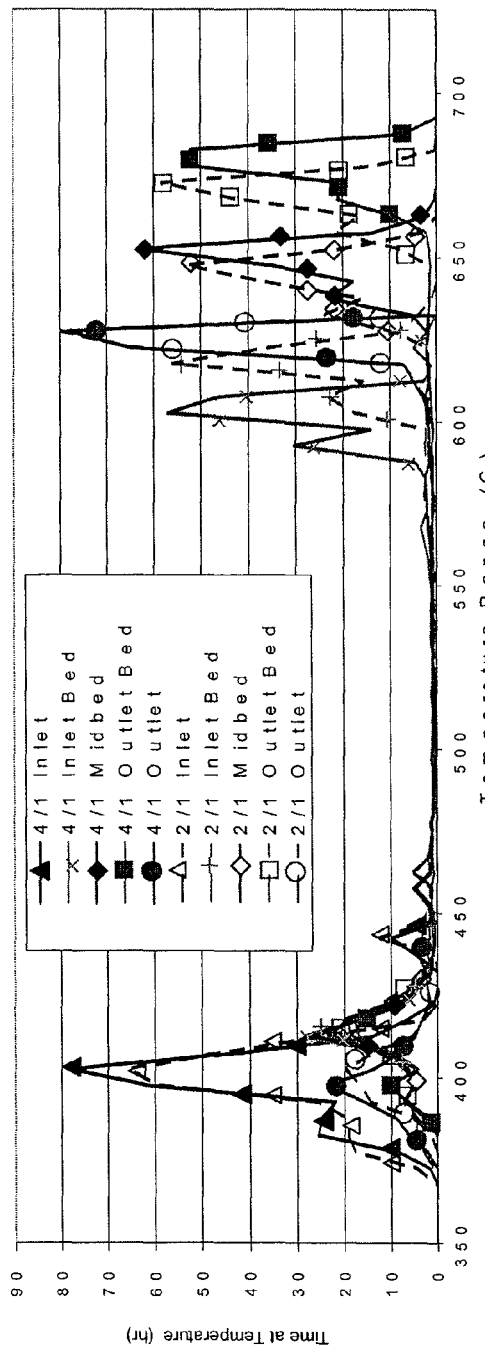
FIGS. 4(a) and 4(b) show histograms for 1200 cycles of aging.
Figure 4B:
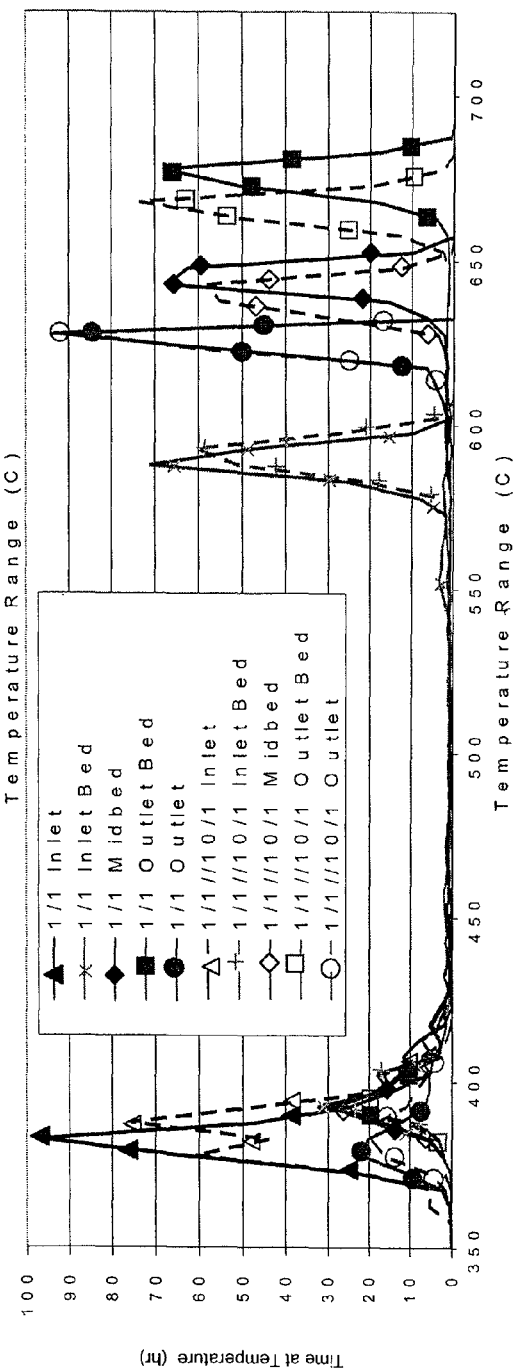

The oxidation catalysts obtained in this way were subjected to an engine ageing process designed to simulate the effect of repeated active regeneration cycles before being characterized. For this purpose, an engine was operated at constant speed and load to generate an exhaust temperature of 350-400 C. To allow two DOCs to be aged simultaneously, an exhaust system was configured which allowed engine exhaust to split and flow into parallel exhaust lines, each equipped with a diesel fuel injector, DOC, and exhaust line. FIG. 3a is picture of this system. Diesel fuel was injected and vaporized within each of these exhaust legs, and ultimately delivered to the DOCs where it was combusted generating an exotherm within the catalyst. Feedback control was utilized to maintain DOC outlet temperatures at 625 C for 10 minutes by modulating diesel fuel injection rate. Fuel injection was then stopped for 5 minutes allowing the DOC to cool. FIG. 3b is an illustration of this aging cycle. Each DOC was exposed to 1200 cycles or 300 hours of this aging prior to evaluation. Histograms illustrating the temperature profiles throughout each aging system over these 1200 cycles are presented in FIGS. 4a and 4b.

Following the aging, each of the oxidation catalysts was evaluated for HC oxidation over hot HD-FTP and SET tests.

Figure 5:
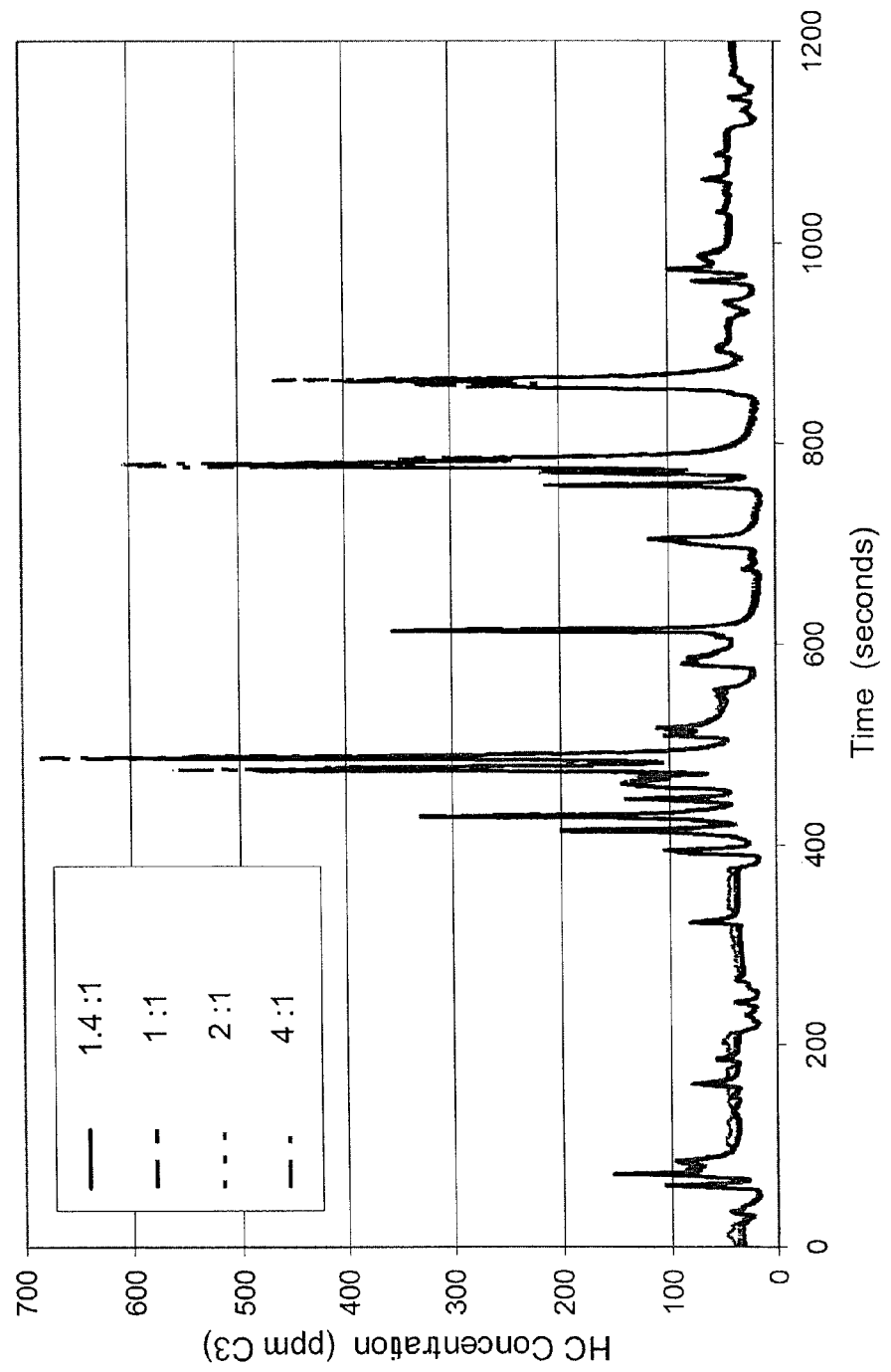
FIG. 5 shows results of hot HD-FTP tests: HC Performance
Figure 6:
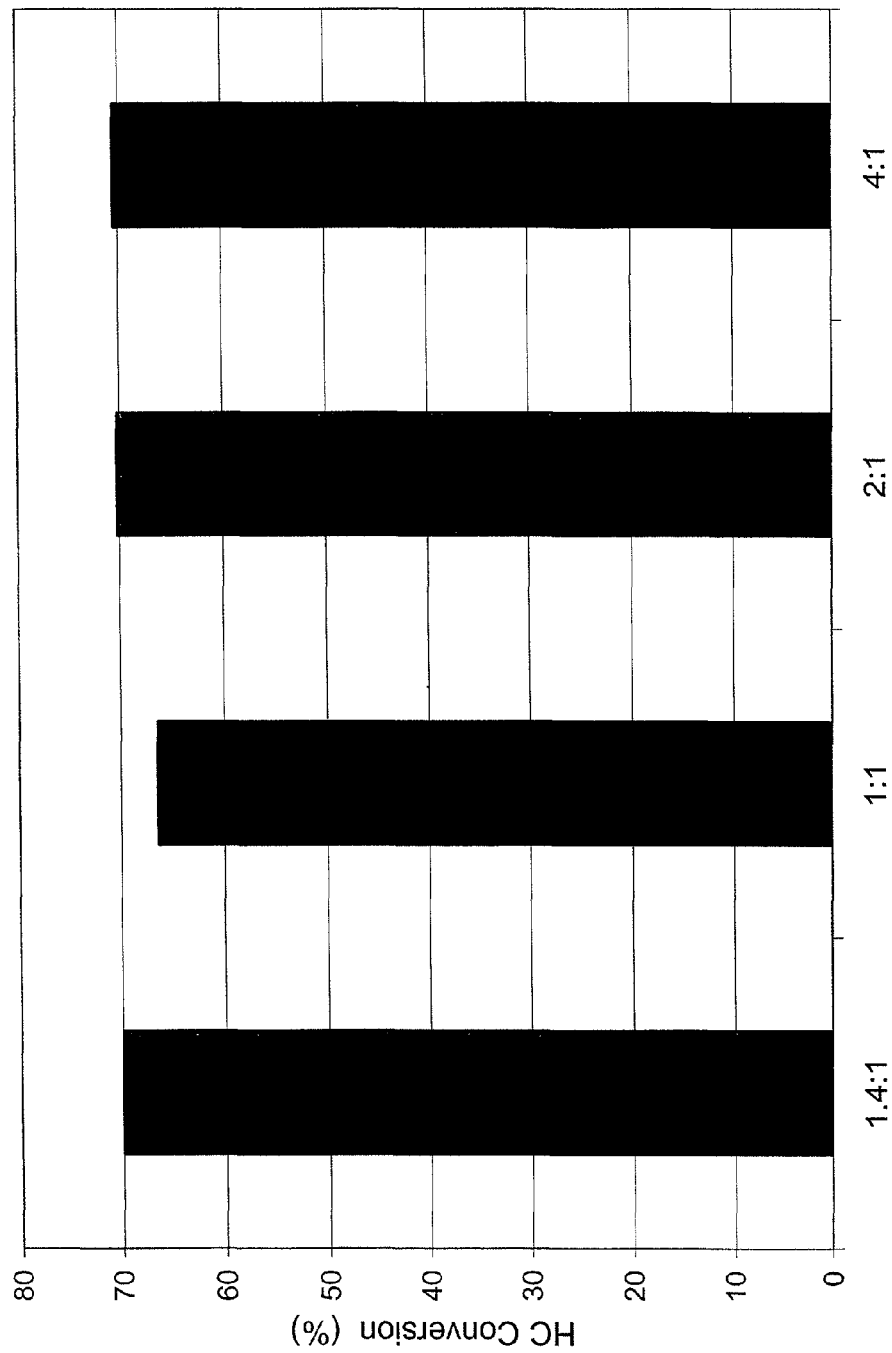
FIG. 6 shows results of HC conversion in hot HD-FTP tests.

FIG. 5 shows the equivalence of engine-out HC levels as measured using a standard emission bench which fed the DOCs during the hot HD-FTP tests. HC conversion levels as determined using standard calculation methods based on a set of emission bench measurements are summarized in FIG. 6. They indicate nearly equivalent performance for the 1.4:1, 2:1, and 4:1 Pt/Pd ratio catalysts. The 1:1 catalyst provided similar but slightly inferior HC oxidation performance under this test condition.

Figure 7:
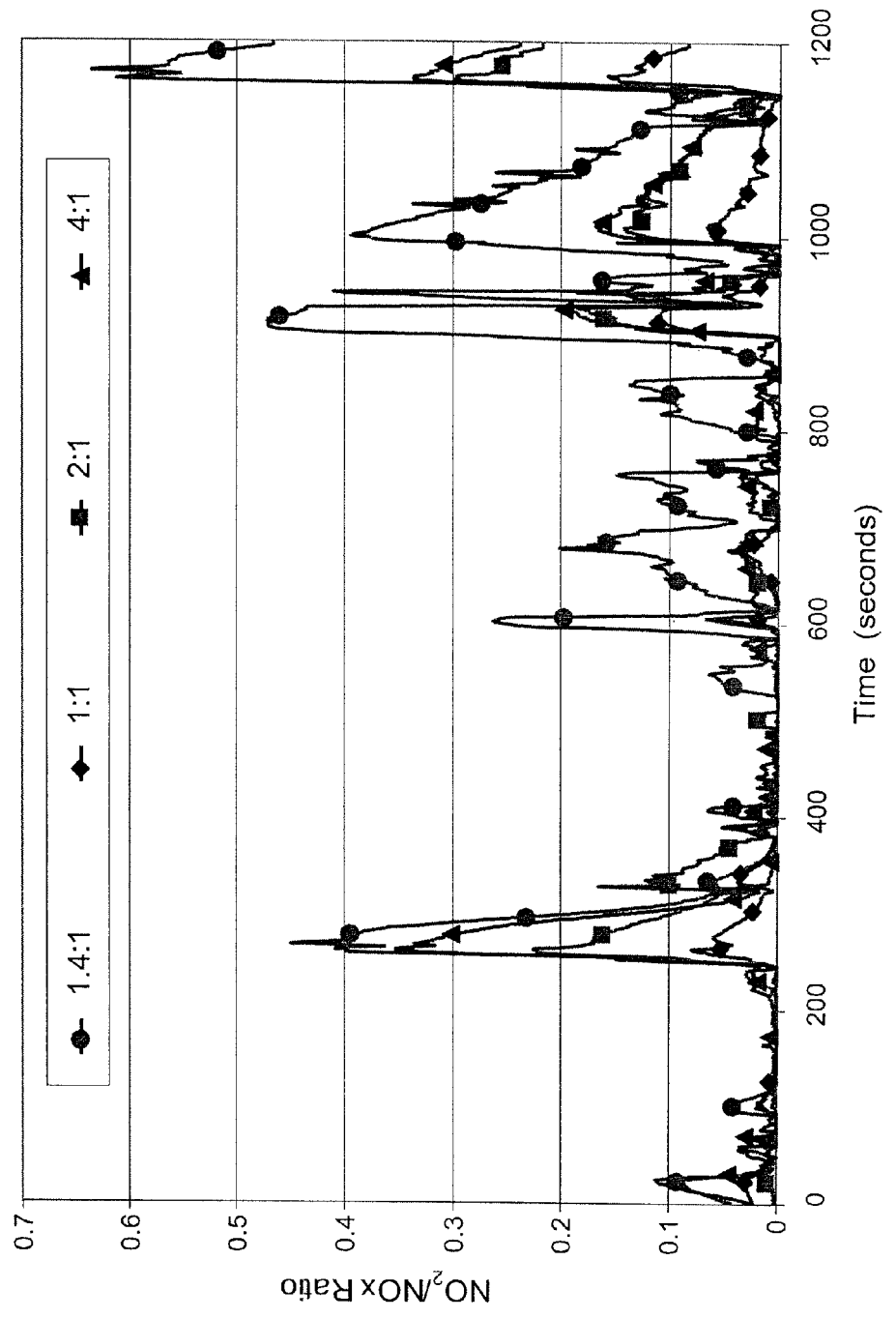
FIG. 7 shows results of $NO_2/NO_x$ formation in hot HD-FTP tests.

FIG. 7 shows the $NO_2$ to NOx ratio as measured with an FTIR during the same set of hot HD-FTP tests. Following light-off at approximately 250 seconds into the test, the 1.4:1 catalyst consistently provided significantly higher $NO_2$/NOx ratios.

Figure 8:
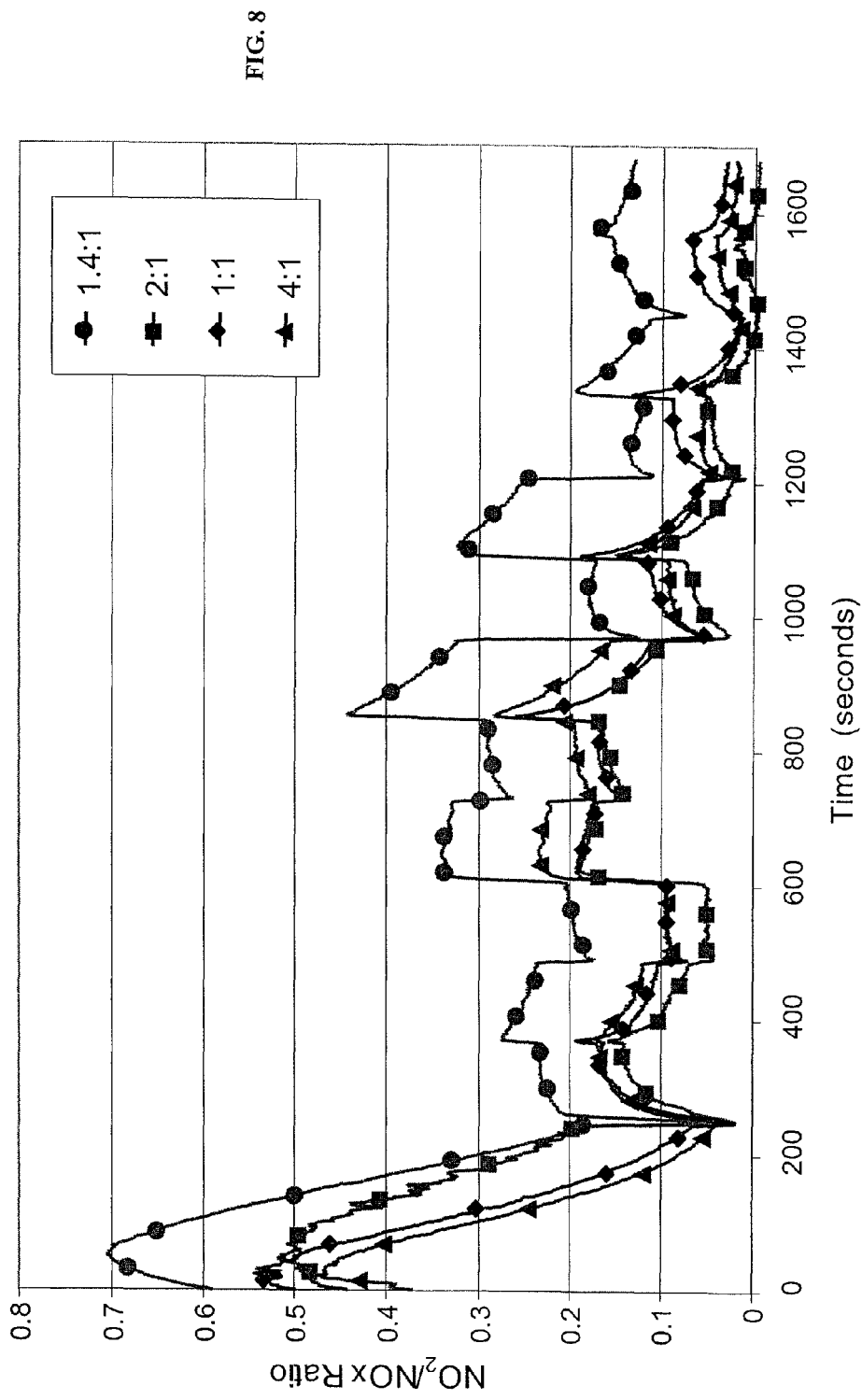
FIG. 8 shows results of $NO_2$ formation in SET tests.

FIG. 8 shows the corresponding $NO_2$ to NOx ratio as measured with an FTIR during a corresponding series of SET tests. Again, the 1.4:1 catalyst consistently provided significantly higher $NO_2$/NOx ratios.

Figure 9:
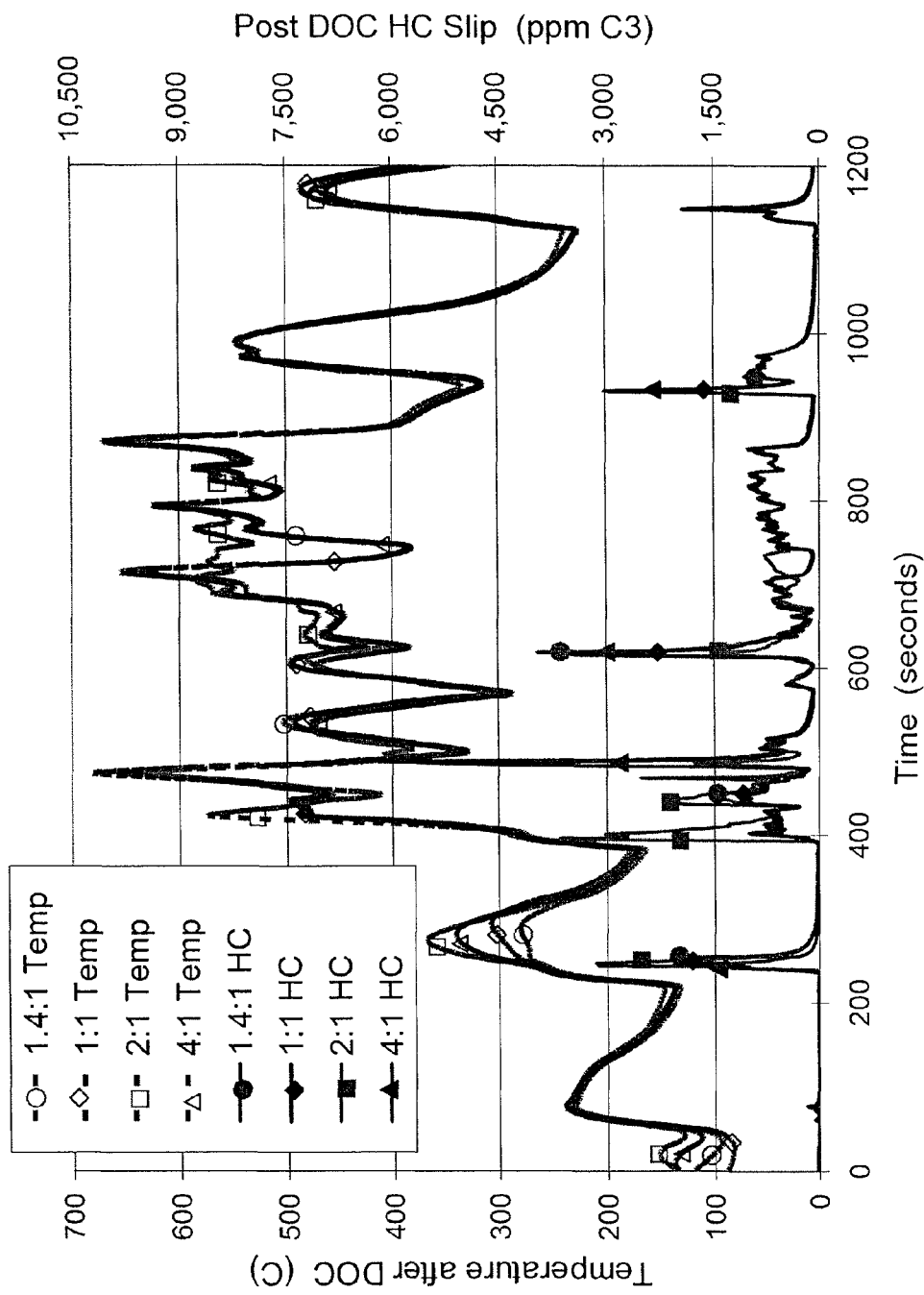
FIG. 9 shows filter regeneration-temperature rise and HC slip in hot HD-FTP tests.
Figure 10:
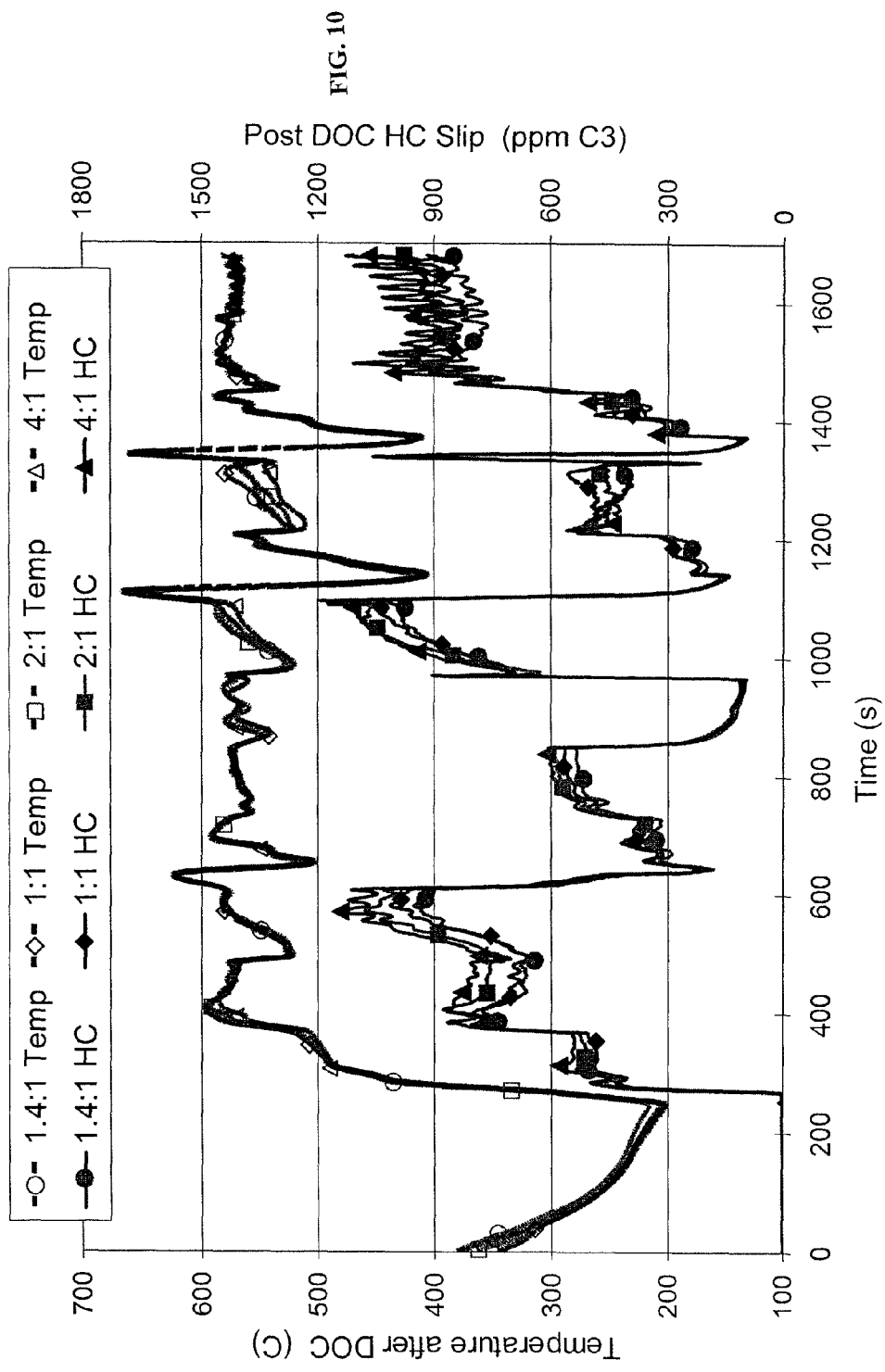
FIG. 10 shows filter regeneration in SET tests.
Figure 11:
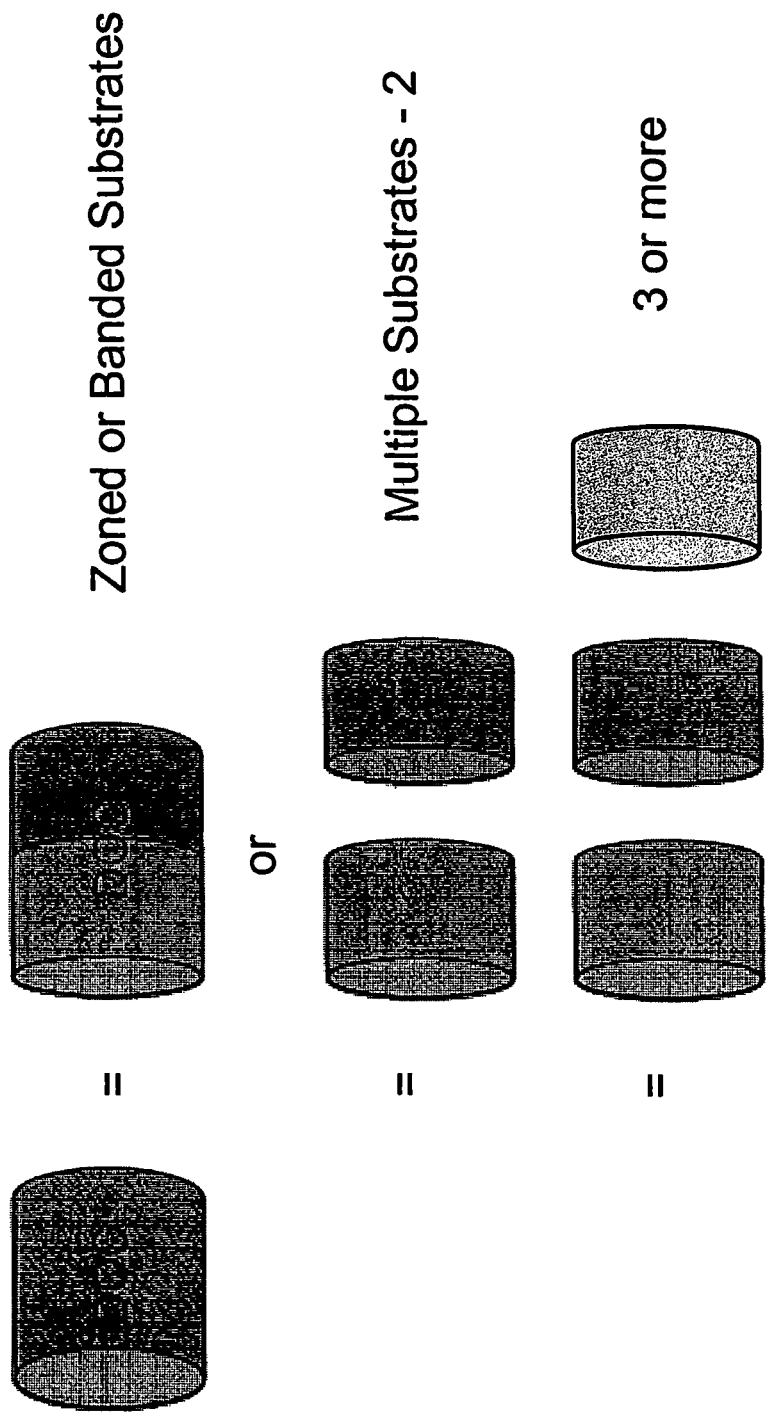
FIG. 11 is an illustration of zoned or banded substrates according to the present invention.
Figure 12:
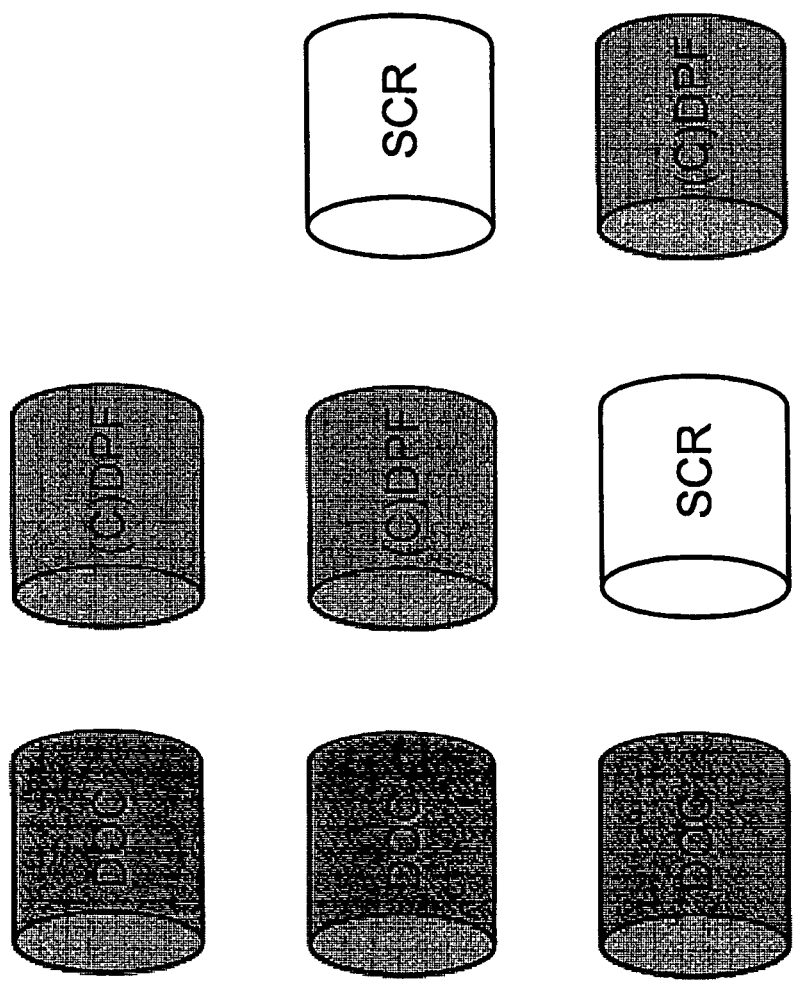
FIG. 12 shows additional designs for zoned substrate.
Figure 13:
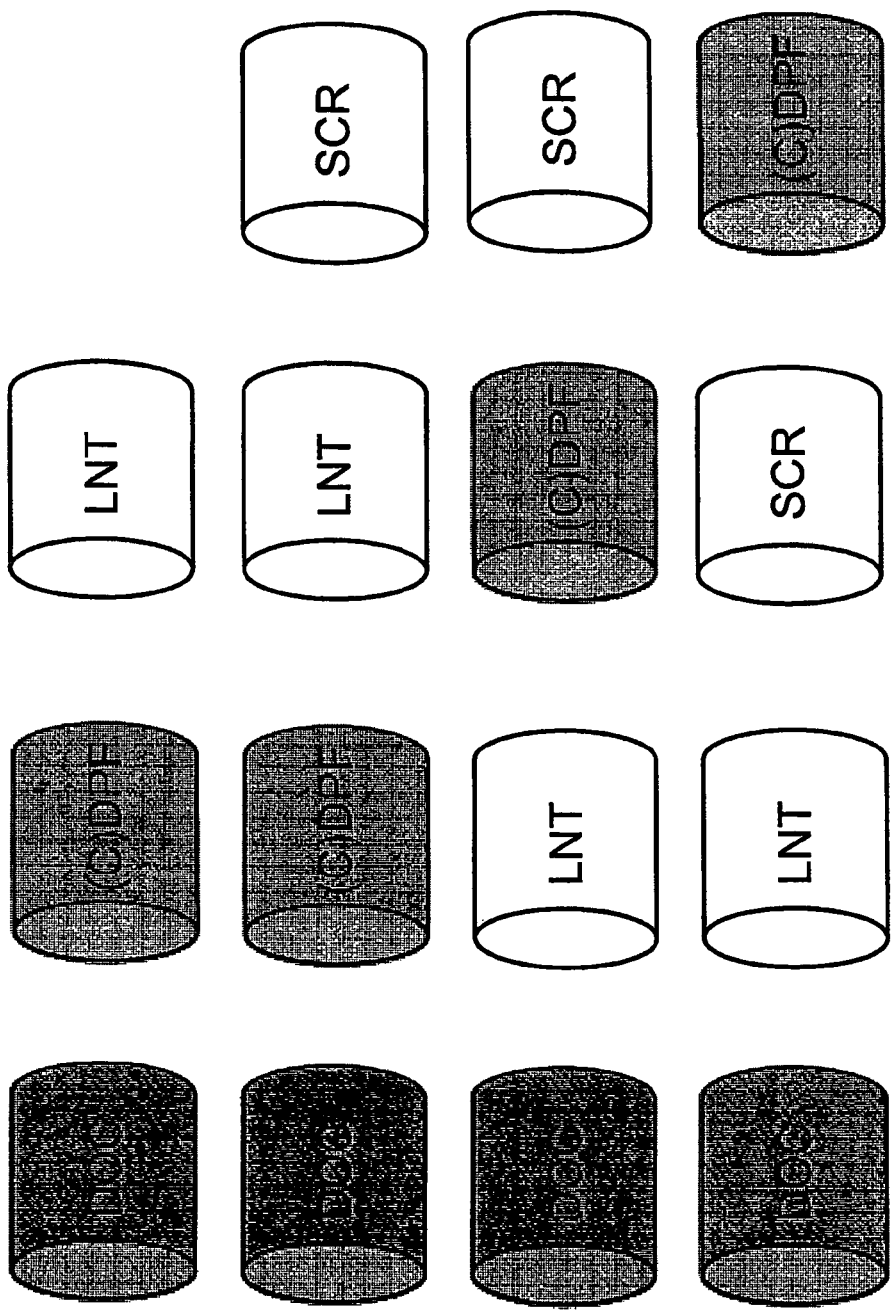
FIG. 13 shows further designs for zoned substrate according to the present invention.

The heat-up capabilities of the different oxidation catalysts were assessed over a series of active regenerations which were triggered either over HD-FTP or SET tests. A comparison of DOC-out temperatures and HC level measured over the HD-FTP filter regenerations are shown in FIG. 9. Corresponding results for SET tests with filter regenerations are shown in FIG. 10. In both types of tests, all catalysts displayed similar capabilities to generate exotherms and control HC slip during active regeneration.

The invention claimed is:

1. A device for the purification of diesel exhaust gases, which device comprises a zoned arrangement of catalysts, in the flow direction of the exhaust gas,
    (a) as a leading catalyst a first oxidation catalyst disposed on a first carrier substrate and immediately following as a trailing catalyst, a second oxidation catalyst disposed on a second carrier substrate,
    wherein the first and second oxidation catalysts contain palladium and platinum in their catalytically active coatings, wherein said first and second carrier substrates are through flow substrates, or
    (b) as a leading catalyst a first oxidation catalyst disposed on a carrier substrate and immediately following as a trailing catalyst, a second oxidation catalyst disposed on said carrier substrate, wherein said carrier substrate is a through flow substrate,
    wherein the first and second oxidation catalysts contain palladium and platinum in their catalytically active coatings;
    and further wherein the total quantity of platinum and palladium in the leading catalyst is high relative to the trailing catalyst,
    and further wherein the ratio of platinum to palladium in the leading catalyst is relatively low, and the ratio of platinum to palladium in the trailing catalyst is relatively high,
    and further wherein the loading of Pt:Pd in the leading oxidation catalyst is from 30 to 250 g/ft$^3$ and the loading of Pt:Pd in the trailing catalyst is from 5 to 100 g/ft$^3$.

2. The device according to claim 1, wherein the zoned arrangement of catalysts consists of a single body with a zone of the first oxidation catalyst on the upstream end of the carrier substrate.

3. The device according to claim 1, wherein the zoned arrangement of catalysts consists of a separate carrier substrate for each of said first and second oxidation catalysts.

4. The device according to claim 1, wherein the trailing catalyst is followed, in the flow direction of the exhaust gas, by an additional emission control component.

5. The device according to claim 4, where the additional emission control component is a filter body.

6. The device according to claim 4, where the additional emission control component is a NOx control catalyst.

7. The device according to claim 6, where the NOx control catalyst is an SCR catalyst.

8. The device according to claim 6, where the NOx control catalyst is an LNT catalyst.

9. The device according to claim 6, wherein palladium is applied to one or more oxidic support materials selected from the group consisting of aluminum oxide, lanthanum-oxide-stabilized aluminum oxide, aluminosilicate, silicon dioxide, titanium dioxide, cerium oxide, cerium-zirconium mixed oxides, rare-earth-metal sesquioxide, zeolite and mixtures thereof.

10. The device according to claim 4, where the additional emission control component comprises a NOx control catalyst and a filter body.

11. The device according to claim 10, wherein the NOx control catalyst includes an SCR catalyst, and an LNT catalyst.

12. The device according to claim 1, where the Pt:Pd ratio in the leading oxidation catalyst is lower than the Pt:Pd ratio in the trailing oxidation catalyst.

13. The device according to claim 12, wherein the oxidation catalysts consist of a platinum- and palladium-containing catalytically active coating on a ceramic or metal throughflow honeycomb body.

14. The device according to claim 13, wherein the leading oxidation catalyst and the trailing oxidation catalyst are on the same throughflow body.

15. The device according to claim 13 wherein the leading oxidation catalyst and the trailing oxidation catalyst are on separate throughflow bodies, even if contained in a common converter.

16. The device according to claim 12, wherein platinum is applied to one or more oxidic support materials selected from the group consisting of aluminum oxide, lanthanum-oxide-stabilized aluminum oxide, aluminosilicate, silicon dioxide, titanium dioxide, cerium oxide, cerium-zirconium mixed oxides, rare-earth-metal sesquioxide, zeolite and mixtures thereof.

17. The device according to claim 1, wherein the relatively low ratio of Pt:Pd in the leading catalyst is between 0:1 and 5:1, and the relatively high ratio of Pt:Pd in the trailing catalyst is between 2:1 to 50:1.

18. The device according to claim 17, wherein the relatively low ratio of Pt:Pd in the leading catalyst is between 0.1:1 and 2:1, and the relatively high ratio of Pt:Pd in the trailing catalyst is between 5:1 to 20:1.

19. A method of producing the diesel exhaust gases purification device of claim 1, comprising the step of:
    a) applying the zoned arrangement of catalysts to the first carrier substrate and the second carrier substrate, or
    (b) applying the zoned arrangement of catalysts to the carrier substrate.

20. A method for the purification of diesel exhaust gases, comprising conducting diesel exhaust gases through the device according to claim 1.

* * * * *